United States Patent [19]

Miyajima et al.

[11] Patent Number: 4,738,790

[45] Date of Patent: Apr. 19, 1988

[54] METHOD FOR CLEANING CONTACT LENSES WITH COMPOSITION CONTAINING AMIDOAMINE SURFACTANT, THIOUREA AND REDUCING AGENT

[75] Inventors: Nobuyuki Miyajima; Kenji Hata, both of Tokyo; Junichi Nakayama, Chiba, all of Japan

[73] Assignee: Toyo Contact Lens Co., Ltd., Nagoya, Japan

[21] Appl. No.: 762,420

[22] Filed: Aug. 5, 1985

[30] Foreign Application Priority Data

Aug. 21, 1984 [JP] Japan .................. 59-173800

[51] Int. Cl.$^4$ .................. C11D 1/88; C11D 3/34
[52] U.S. Cl. .................. 252/105; 252/94; 252/544; 252/546; 252/DIG. 14
[58] Field of Search .................. 252/174.12, 546, 94, 252/DIG. 12, 105, DIG. 14

[56] References Cited

U.S. PATENT DOCUMENTS

| | | | |
|---|---|---|---|
| 3,358,017 | 12/1967 | Seifert | 252/105 |
| 3,910,296 | 10/1975 | Karageozian | 134/2 |
| 4,268,406 | 5/1981 | O'Brien et al. | 252/105 |
| 4,285,738 | 8/1981 | Ogata | 134/6 |
| 4,414,127 | 11/1983 | Fu | 252/95 |
| 4,485,029 | 11/1984 | Kato et al. | 252/106 |
| 4,500,441 | 2/1985 | Tanaka et al. | 252/89.1 |
| 4,568,517 | 2/1986 | Kaspar et al. | 422/30 |

FOREIGN PATENT DOCUMENTS

| | | |
|---|---|---|
| 402252 | 5/1966 | Fed. Rep. of Germany . |
| 58708 | 5/1977 | Japan . |
| 25437 | 2/1980 | Japan . |
| 209713 | 12/1983 | Japan . |
| 1601430 | 10/1981 | United Kingdom . |

*Primary Examiner*—Prince E. Willis
*Attorney, Agent, or Firm*—Burns, Doane, Swecker & Mathis

[57] ABSTRACT

This invention provides a detergent composition by which proteinaceous depositions can be easily removed from contact lenses in a short time, and a method for removing such depositions from the contact lenses. The detergent composition comprises an anionic or amidoamine-type ampholytic surfactant; and thiourea or a reductant.

4 Claims, No Drawings

METHOD FOR CLEANING CONTACT LENSES WITH COMPOSITION CONTAINING AMIDOAMINE SURFACTANT, THIOUREA AND REDUCING AGENT

BACKGROUND OF THE INVENTION

(1) Field of the Invention

This invention relates to a detergent composition for contact lenses, in particular a detergent composition which is useful for removing proteinaceous depositions or retentions from contact lenses. This invention also relates to a method of removing such depositions and retentions from contact lenses.

(2) Description of the Prior Art

Among contact lenses, there are hard contact lenses primarily composed of methyl methacrylate, soft contact lenses comprising 2-hydroxy methacrylate or N-vinyl pyrrolidone, and silicone contact lenses which are made or the like of hydrophilin by surface treatment or the like of a hydrophobic material made from polysiloxane series. Since, in particular, soft contact lenses and silicone contact lenses are flexible, good in oxygen permeability and since they can easily be fitted when these lenses are on the eyes, these lenses are widely used nowadays.

When such flexible contact lenses are warn for a long time, lipid, protein, mucin in tear and bacteria are deposited on the surface and into the mass thereof. Those depositions make the lenses opaque and also injure the eye.

Lipid deposited on the surface of a contact lens can be removed therefrom almost completely by detergents containing a surfactant as the main component. And although said detergents are generally used for this purpose, they do not remove proteinaceous and mucinic depositions. In particular, boiling and sterilization of the contact lens further denature and coagulate the protein, so that the protein is strongly fixed to the lenses. As a result, the life of the lens is shortened.

There have been known detergents comprising protease and hydrosulfide compound for cleaning contact lenses deposited with protein and mucin. These detergents are effective in cleaning such lenses but have a weak point in that a long time is required for cleaning. There have also been known detergents prepared by adding at least one compound selected from urea and guanidine hydrochloride to said detergents in order to shorten the cleaning time. However, such shortening effect is not necessarily satisfactory.

SUMMARY OF THE INVENTION

Under such circumstances, the present inventors made a deep study of removal of dirt comprising mainly protein and mucin firmly attached to contact lenses (this dirt is hereinafter referred to as proteinaceous depositions), and they found a detergent composition by which such proteinaceous depositions can be easily removed from the contact lenses in a short time.

It is, therefore, a primary object of the present invention to provide a detergent composition for contact lenses by which proteinaceous depositions can be removed from the contact lenses in a short time.

Another object of this invention is to provide a method effective in removing such depositions from the contact lenses.

These and other objects of this invention will be clear from the following description.

In accordance with the present invention, there is provided a detergent composition used for cleaning contact lenses, which comprises (A) at least one surfactant selected from the group consisting of anionic surfactants and amidoamine-type ampholytic surfactants; and (B) at least one compound selected from the group consisting of thiourea and reductants. The invention also provides a method for removing proteinaceous depositions from the contact lenses using such a detergent composition.

DESCRIPTION OF THE PREFERRED EMBODIMENTS

In the detergent composition of the present invention, many kinds of anionic surfactant can be used. It is preferable that there be used at least one anionic detergent selected from the group consisting of alkylbenzene sulfonate, alkane sulfonate, olefine sulfonate, alkyl sulfate, alkyl ether sulfate, alkylphenyl ether sulfate, and the like, preferably, selected from the group consisting of anionic sulfactants having good solubility at low temperature, such as $\alpha$-olefine sulfonate having 8 to 14 carbon atoms, inner olefine sulfonate having 8 to 20 carbon atoms, paraffin sulfonate having 8 to 18 carbon atoms, ethylene oxides or propylene oxides adducted (the average adduct mole number thereof being about 2 to about 6) alkyl ether sulfate and alkylphenyl ether sulfate wherein these alkyl groups have 8 to 16 carbon atoms. There are used such anionic detergents as alkali metal salts such as sodium salts and potassium salts, or amine salts such as triethanol amine salts.

In the detergent composition of the present invention, there are used amidoamine-type ampholytic surfactants prepared by reacting fatty acids, ethylenediamines having a substituent in an optional position thereof and ampholytating agents. In this case, the fatty acid is a component consisting of lipophilic group of the ampholytic surfactants. Examples of these fatty acids include lauric acid, myristic acid, palmitic acid, stearic acid, behenic acid, oleic acid, coconut oil fatty acid, palm oil fatty acid, tallow oil fatty acid and soybean oil fatty acid.

These fatty acids can be used individually or in combination. Examples of these ethylenediamins are ethylenediamine, N-ethylethylenediamine, aminoethyl ethanolamine and aminoethyl propanolamine. Since aminoethyl ethanolamine can be easily obtained and since it easily reacts, it is preferable that an aminoethyl ethanolamine be used.

Alkylating agents having either a carboxylic group or a substituent which forms a carboxylic group by hydrolysis are used as ampholytating agents. Examples are haloacetic acids such as monochloroacetic acid, its salt, monobromoacetic acid, $\alpha,\beta$-unsaturated carboxylic acids and their derivatives such as acrylic acid and its salts, acrylate such as methyl acrylate, ethyl acrylate, and methacrylate such as methyl methacrylate, ethyl methacrylate.

It is preferable to use ampholytic surfactants having the following formula:

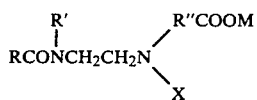

wherein R is an aliphatic hydrocarbon group having 7 to 23 carbon atoms, preferably 7 to 17 carbon atoms, such group being saturated or unsaturated, and being straight chain or having some branched chains;

R' is hydrogen, alkyl group having 1 to 3 carbon atoms or hydroxyalkyl group having 2 to 4 carbon atoms;

R" is an alkyl group having 1 to 3 carbon atoms; and

X is hydrogen or R"COOM wherein M is a cation able to form an aqueous solbule salt, preferably alkali metal ion such as sodium or potassium, or alkanolammonium ion.

In the detergent composition of the present invention, there can be used many kinds of reductants, for example sulfites, bisulfites, dithionites, boron hydride salts, water-soluble mercapto compounds, and the like. It is preferable that sulfurous acid alkali metal salts, hydrogen sulfurous acid alkali metal salts, cysteine, cysteine hydrochloride, dithiothreitol, dithioerythritol, thioglycerin and the like be used.

In the detergent composition of the present invention, the amount of component (A) is optional, but is ordinarily 0.01 to 50% by weight, preferably 0.1 to 20% by weight. The amount of the component (B) is also optional, but is ordinarily 0.01 to 60% by weight, preferably 0.1 to 40% by weight. Furthermore the weight ratio of the amount of component (A) to those of component (B) is preferably 1/9 to 9/1. In addition, it is preferable if at least one surfactant selected from anionic surfactants and amidoamine-type amphoteric surfactants be used together with reducing agents and thiourea since this makes it possible to further shorten the time required for cleaning contact lenses.

Since the detergent composition of the present invention essentially comprises component (A) and (B), adsorption of said surfactant, i.e., component (A), on the proteinaceous depositions gives electric repulsion force to such depositions and thereby each of the depositions can be easily dispersed. At the same time, such depositions can easily be dispersed by the reductant of component (B) cutting the S-S bond of said deposition, and the thiourea of component (B) greatly reduces hydrophobic interaction between protein molecules. As a result, the effect in removing such depositions is high.

Suitable buffering agents and stabilizing agents can be added to the detergent composition of the present invention. For example, sodium citrate, potassium citrate, citric acid, boric acid, disodium edetate, various mixtures of phosphate buffering agents, sodium bicarbonate or the like can be added thereto. The amount of such buffering agents and stabilizing agents added is from about 0.001 to about 2.5% by weight, preferably from about 0.01 to 1% by weight. Futhermore, neutral inorganic salts can be added to the detergent composition in order to make the solution to be substantially isotonic. It is preferable if 0.8 to 1.0% by weight of sodium chloride, the main component of tear be added thereto.

In order to increase detergency, quanidine, a guanidine acid salt such as quanidine hydrochloride or guanidine acetic acid, urea, etc. may be contained in the detergent composition of the present invention.

The formulation of the detergent composition of the present invention can take the form of a liquid which contains an aqueous medium and it also can take the form of a powder or solid. For making the detergent composition of the present invention in the form of a powder or solid, lubricants, binders and shaping agent can be added to the detergent composition. Among these agents are included glycerine, sorbitol, propylene glycol, polyethylene glycol, dextrane, methyl cellulose, hydroxyethyl cellulose, aqueous soluble salts of carboxymethyl cellulose or natural hydrophilic compounds such as gelatine, alginates, tragacanth, pectin, gum arabic, and soluble starches. These agents can be used in the amount of 0.01 to 10% by weight, preferably 0.1 to 5% by weight.

The method for use of the detergent composition of the present invention is as follows: First, there is prepared an aqueous solution containing an effective cleaning amount, for example between 0.02 to 60%, preferably 0.2 to 40% by weight, of such a detergent composition. In particular, it is generally better for the aqueous solution to contain 0.01–50% by weight of component (A) and 0.01–60% by weight of component (B), preferably 0.1–20% by weight of the former and 0.1–40% by weight of the latter. Futhermore, the aqueous solution preferably contains 0.1–20% by weight of component (A), 0.1–40% by weight of thiourea and 0.1–10% by weight of at least one reductant. The pH of these solutions is ordinarily 3 to 11, preferably 5 to 9.

Thereafter, the contact lenses are removed from the wearer's eyes and put into said solution. The lenses are allowed to soak for a period of about 1 minute to about 24 hours at a temperature of, for example, 0° to 100° C. Soaking in a heated solution improves detergency.

The present invention now will be further illustrated by the following examples.

EXAMPLE 1

0.8 g of sodium α-olefine sulfonate, 1 g of thiourea, 0.1 g of sodium chloride and 0.01 g of disodium edetate were put in a plastic container, after which water was added to bring the total amount to 10 ml. A dirty soft contact lens which had been used for 6 months was soaked in the solution for about 3 hours at room temperature and then the lens was taken out and simply washed with water. It was then soaked it physiologic saline for an hour. As a result, a cleaned lens was obtained.

EXAMPLE 2

Cleaning was conducted by the same procedure as described in example 1 except that 1 g of amidoamine-type ampholytic surfactant (sodium salt) prepared by using coconut oil fatty acid, aminoethanolamine and ethyl acrylate, 0.8 g of thiourea, 0.1 g of sodium chloride and 0.01 g of sodium citrate were used, whereby a cleaned lens was obtained.

EXAMPLE 3

Cleaning was conducted by the same procedure as described in example 1 except that 1 g of amidoamine-type ampholytic surfactant (sodium salt) prepared by using coconut oil fatly acid, aminoethyl ethanolamine and ethyl acrylate, 0.5 g of L-cysteine, 3 g of thiourea, 0.1 g of sodium chloride and 0.01 g of disodium edetate were used, whereby, a cleaned lens was obtained.

EXAMPLE 4

Cleaning was conducted by the same procedure as described in example 1 except that 0.9 g of sodium polyoxyethylene alkyl ether sulfate (Starting Material: Dobanol ® 23 manufactured by Mitsubishi Petrochemical Co., Ltd.; Average molecular number of ethylene oxide adducted: 5), 0.5 g of thiourea, 0.4 g of sodium sulfite, 0.1 g of sodium chloride and 0.01 g of sodium citrate were used, whereby a cleaned lens was obtained.

EXAMPLE 5

Cleaning was conducted by the same procedure as described in example 1 except that 1 g of sodium polyoxyethylene alkyl ether sulfate (Starting Material: Dobanol ® 23; Average molecular numbers of ethylene oxide adducted: 3), 0.7 g of thiourea, 0.2 g of sodium bisulfite, 0.1 g of sodium chloride and 0.005 g of disodium ethylenediamine tetraacetate were used, whereby a cleaned lens was obtained.

EXAMPLE 6

Cleaning was conducted by the same procedure as described in example 1 except that 0.5 g of sodium inner olefine sulfate having 13 and 14 of carbon atoms, 0.3 g of cystein hydrochloride, 3 g of thiourea, 0.1 g of sodium chloride, 0.01 g of sodium citrate and 0.005 sodium bicarbonate were used, whereby a cleaned lens was obtained.

EXAMPLE 7

Cleaning was conducted by the same procedure as described in example 1 except that 0.5 g of sodium polyoxyethylene alkyl ether sulfate (starting alchol: lauryl alchol manufactured by Yoneyama Yakuhin Kogyo Co., Ltd.; Average molecular number of ethylene oxide adducted: 5), 0.5 g of amidoamine-type ampholytic surfactant (potassium salt) prepared by using lauric acid, aminoethyl ethanolamine and methyl acrylate, 0.9 g of thiourea, 0.1 g of sodium chloride and 0.01 g of sodium citrate were used, whereby cleaned lens was obtained.

EXAMPLE 8

Examples 3 to 6 were repeated, except that the lens was soaked for one hour, whereby a cleaned lens was obtained.

EXAMPLE 9

Cleaning was conducted by the same procedure as described in example 1 except that 0.7 g of sodium sulfite was used instead of 1 g of thiourea, whereby a cleaned lens was obtained.

EXAMPLE 10

Cleaning was conducted by the same procedure as described in example 1 except that 1.2 g of sodium polyoxyethylene alkyl ether sulfate the same as used in example 5), 0.01 g of sodium borohydride, 0.1 g of sodium chloride, 0.01 g of sodium bicarbonate and 0.01 g of citric acid were used, whereby a cleaned lens was obtained.

What is claimed is:

1. A method for removing proteinaceous deposits from contact lenses comprising contacting a contact lens having proteinaceous deposits for a period of time sufficient to clean the lens with an aqueous detergent solution comprising 0.01 to 50% by weight of at least one surfactant selected from the group consisting of and amidoamine-type ampholytic surfactants having the following formula:

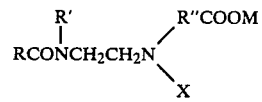

wherein R is an aliphatic hydrocarbon group having 7 to 23 carbon atoms;
  R' is hydrogen, an alkyl group having 1 to 3 carbon atoms or an hydroxyalkyl group having 2 to 4 carbon atoms;
  R" is an alkyl group having 1 to 3 carbon atoms;
  X is a hydrogen or R"COOM wherein M is a cation able to form an aqueous soluble salt;
  5 to 60% by weight of thiourea; 0.01 to 60% by weight of at least one reductant selected from the group consisting of sulfites, bisulfites, dithionites, boron hydride salts, water-soluble mercapto compounds, sulfurous acid alkali metal salts, hydrogen sulfurous acid alkali metal salts, cysteine, cysteine hydrochloride, thioglycerin, dithiothreitol and dithioerythritol; and the balance being water.

2. A method as set forth in claim 1, wherein the aqueous detergent solution further contains a buffering agent in such amount that it becomes substantially isotonic.

3. A method as set forth in claim 1, wherein the detergent composition is comprised of 0.1 to 20% by weight of the surfactant, 5 to 40% by weight of thiourea and 0.1 to 10% by weight of the reductant.

4. A method as set forth in claim 1, wherein the cleaning time is from about 1 minute to about 24 hours.

* * * * *